Nov. 28, 1961 C. E. BEACHELL 3,011,032

APPARATUS FOR RECORDING SIGNALS ON MAGNETIC TAPE

Original Filed April 2, 1956

INVENTOR
CHESTER E. BEACHELL
by R. J. Filipkowski
AGENT

United States Patent Office 3,011,032
Patented Nov. 28, 1961

3,011,032

APPARATUS FOR RECORDING SIGNALS ON MAGNETIC TAPE

Chester E. Beachell, Beaconsfield West, Quebec, Canada, assignor to Canadian Patents and Development Limited, Ottawa, Ontario, Canada Original application Apr. 2, 1956, Ser. No. 575,518. Divided and this application May 15, 1958, Ser. No. 735,544
7 Claims. (Cl. 179—100.2)

This invention relates to magnetic recording and reproducing systems, and is particularly concerned with electronic circuits for use in the magnetic recording and reproducing of sound from tape.

The present application is a division of my application Serial Number 575,518 filed April 2, 1956, for "Sound Recording and Reproducing Apparatus Utilizing Perforated Magnetic Tape." The above identified application discloses film handling and transport mechanism arranged to stabilize to a very high order of precision the velocity and tension of a tensioned, fixed loop of narrow thin limp magnetic tape, having a polyester base such as that sold under the trade name "Mylar" and having a magnetic coating applied to its surface. This invention has as its principal object to provide recording and reproducing amplifier circuits whereby a high fidelity audio signal may be impressed upon and generated from the tape, employing separate magnetic heads for recording a signal on the tape and for reproducing a signal therefrom, wherein the single recording head applies both signal and bias frequencies.

It is a further object of the invention to provide a self-contained electronic amplifier system for magnetic recording and reproducing apparatus having superior economy of current and electrical supply demands as compared with systems heretofore devised for portable use.

The invention may be the better understood from the description of embodiments thereof with reference to the accompanying figures of drawing, wherein.

Figures 1, 2, 3:
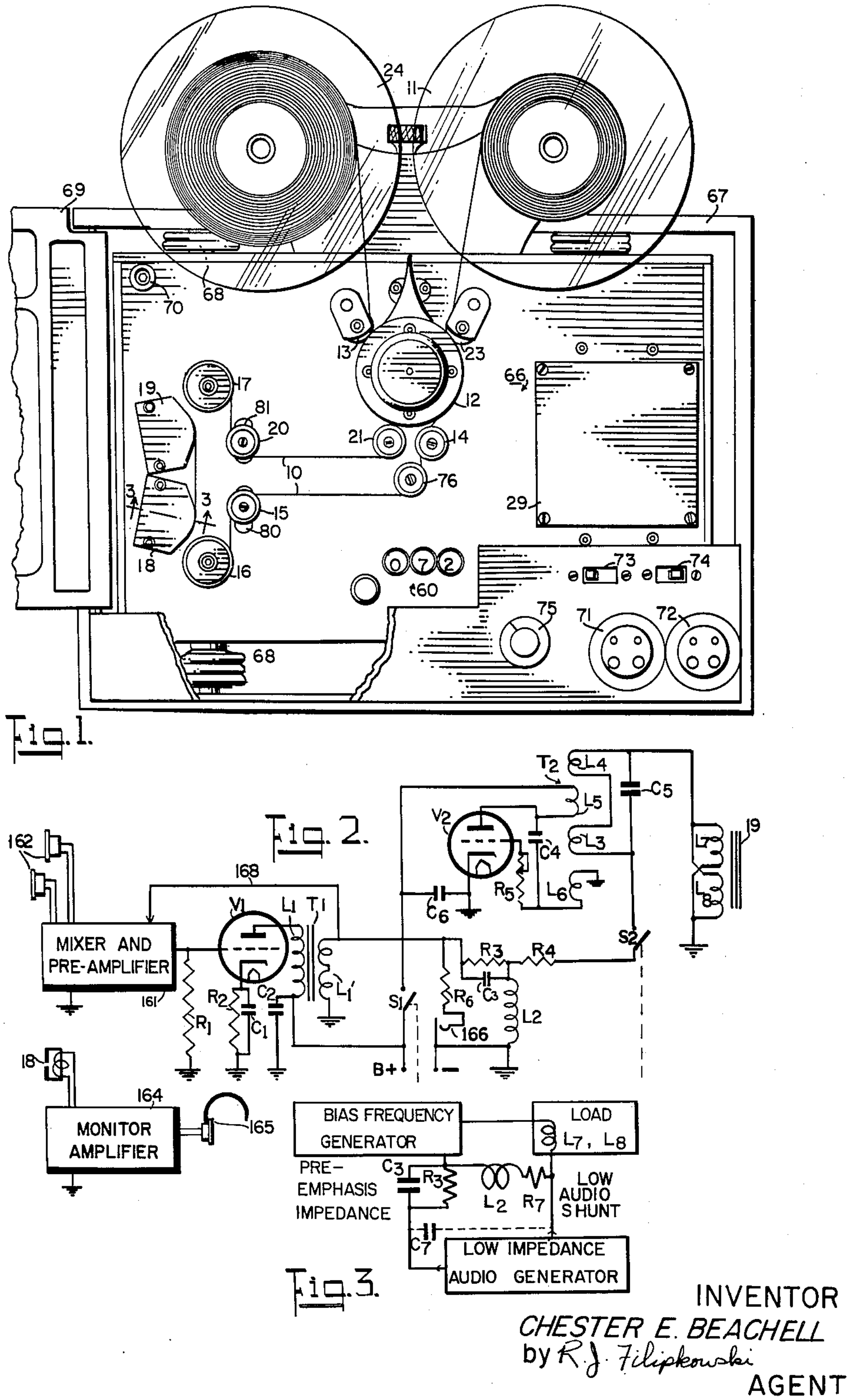
FIG. 1 is a front elevation view of a tape handling apparatus including amplifiers, sound and signal circuits according to the invention.
FIG. 2 is a schematic diagram for a circuit for energizing a recording head.
FIG. 3 is a schematic diagram for analyzing recording circuit impedance relationships and distributions in the recording head of currents supplied from bias and audio frequency generators.

The present invention is useful in the recording of sound on magnetic recording media and particularly in the recording of audio signals of high quality upon a limp magnetic tape employed in the recording of picture sound by means of a portable tape handling mechanism associated with a moving picture camera. Such composite apparatus is more fully described in my copending application 575,518, and is generally illustrated in FIG. 1. Briefly, the aforesaid apparatus as realized in the form of a typical field type of sound unit including the invention, comprises an outer housing 67 having a hinged door 69, enclosing a casing 66 supported in the housing by anti-shock suspension mountings 68. A pair of reels 11 and 24 mounted on casing 66 carry a length of magnetic tape. Amplifier means and batteries (not shown) may be carried in the housing at the base thereof, and a control panel may be provided including volume control 75, filament and high tension supply switches 73, 74, and electrical cable and microphone circuits 71, 72.

On the front plate of casing 66 a sprocket drum 12 carries a lay 10 of thin, narrow, limp magnetic tape having a polyester base such as that sold under the trade mark "Mylar," the tape moving from take-off reel

11, and entering the transport mechanism in precise footage registry with the feeding of a picture film strip in an associated camera (not shown). The tape has a line of sprocket holes regularly spaced therealong and is driven by drum 12, the latter being suitably driven by linkage to the drive of the camera. The tape is fed into and returned from a tensioned fixed loop, and is wound upon take-up reel 24.

As the tape progresses at constant velocity in the loop, it passes under toggling gate 13, over an arc of the sprocketed drum 12, then under retaining idler 14 and thence vertically downward, being bent in a right angle turn under stabilizing roller 15 to frictionally engage disc 16 by an arc of substantially 180 degrees. It then passes laterally to engage a further disc 17 similarly, making contact with a monitor or replay transducer 18, and a recording transducer 19 positioned on the casing to wipe the lay. After passing disc 17, the lay bends in a right angle bend about stabilizing roller 20 and continues upwardly to fixed idler 21, engaging an arc of sprocket drum 12 on the side opposite to the entering lay.

It is highly desirable while the recording is proceeding to monitor the actually recorded track in the tape, for which purpose the head 18 serves in the capacity of monitor and playback head. Suitable headphone or other listening device 165 is supplied with sound signal from amplifier 164 to which head 18 is operatively connected as in FIGURE 3. It will be understood that both heads 18 and 19 are correctly positioned to align their gaps with reference to a standard direction and in registry with the track along the tape, preferably as by means described in my copending application, also a division of my application 575,518 titled "Adjustable Mounting for Magnetic Head and the Like."

A recording head energizing circuit particularly suited to the operation of a portable unit for high quality professional recording is described with reference to FIGS. 2 and 3. In FIG. 2, sound transducers such as microphones 162 associated with the recording unit are connected to mixer and pre-amplifier unit 161, which may physically be mounted in the housing 67 along with its supply sources in the form of batteries, by cables connected to plugs 71, 72. The recording unit includes a bias frequency generator stage including tube $V_2$, and a recording amplifier stage containing the tube $V_1$ whose output is carried at low impedance levels of signal through an equalizing network, in series with the secondary of a bias frequency generator output transformer, thence through the coils of head 19.

When switches $S_1$, $S_2$ are closed, the bias oscillator tube $V_2$ is energized and the output of final audio amplifier stage tube $V_1$ is connected through a filter circuit to the recording head 19, by way of a modulation transformer generally indicated at $T_2$. Output tube $V_1$ of the recording amplifier includes an input coupling grid resistor $R_1$, a cathode bias circuit $R_2$ and $C_1$ in parallel, and output transformer $T_1$, the latter comprising a high impedance primary $L_1$ and a low impedance secondary $L_1'$. The recording amplifier is stabilized by a feedback loop indicated by the path 168, in the manner well-known in the art of negative feed-back. This obtains the advantage of substantially constant low impedance output. An audio signal equalizing circuit connected in the amplifier output circuit comprises a network including resistor $R_3$ shunted by $C_3$ and a series resistor $R_4$, with a branch shunt arm comprising a resistive inductor $L_2$. Provision is made for monitoring the recording amplifier output including jack 166 in series with a relatively high impedance resistor $R_6$.

Bias oscillator tube $V_2$ has its plate and grid circuits inductively coupled to sustain self-oscillation, wherein plate coil $L_5$, grid coil $L_6$, and capacitor $C_4$ determine the oscillatory frequency of bias energy, which in the present example is not less than 60 kilocycles per second. A two-winding tank circuit $L_3$ and $L_4$ paralleled by $C_5$ is likewise tuned to the bias frequency and is inductively coupled with the oscillatory circuit. The tank circuit is connected in series between the audio output voltage supplied from the low impedance secondary $L_1'$ of transformer $T_1$ of the recording amplifier and the windings $L_7$, $L_8$ of recording head 19. Large values of capacity are employed in $C_2$ and $C_6$ to avoid feeding of bias and audio voltages through the supply B+. Oscillator output voltage is adjusted by means of variable grid resistor $R_5$.

The electrical circuit described has been found to gain a number of advantages. It combines into a single composite signal both the audio A.C. voltage and the constant amplitude high frequency A.C. biasing voltage, which are applied together to the paralleled windings in head 19. The bias oscillator is not loaded by the output of the recording amplifier, nor is the recording amplifier loaded by the interaction with it of the bias oscillator through a common bus or impedance. This avoids the defects apparent in a conventional system using capacitor injection of a bias frequency voltage into a head winding, wherein the high frequency components of the audio signal, particularly those above about 10 kc. per second, are attenuated. It is well known that for longitudinal recording on a tape moving at relatively low speed it is necessary to emphasize the highs hence such attenuation is objectionable. The combining circuit chosen in the present system may be shown to largely avoid adverse effects on high audio components, and provides remarkable economy of supply.

Referring now to FIGURE 3, the schematic diagram shown therein describes the relationships of the respective generators, the load presented by the recording head, and the impedances employed for obtaining high audio pre-emphases. The bias frequency generator, while having a parallel resonant tank circuit, is effectively a very low D.C. resistance to its own frequency. The load at which it is desired to dissipate energy delivered from the bias frequency generator, has very high relative impedance, due to the inductance of the windings, as well as their resistance, and due partly to the coupling with the coating in the magnetizable tape. At a frequency of 60 kc. per second the impedance of the head is several times the sum of all other impedances in the loop carrying the bias frequency current. The audio frequency generator, which in this instance is the output section of the recording amplifier, is effectively a low impedance source at any frequency in its range, and is stabilized by virtue of large negative feedback being employed between the output and an input stage. At the same time, owing to the inherent capacity $C_7$ of the transformer secondary, as well as the output cable, there is a low impedance shunt path presented to the bias frequency current in the load loop. By virtue of the fact that the bias frequency oscillator has relatively low values of inductance and capacity forming the resonant circuit, this generator has low series impedance to audio frequency currents.

For saturating drive of the head windings at all audio frequencies without overdriving at low values, the feed system according to the invention includes series and shunt impedances to audio frequency currents, so chosen as to shunt the lower audio frequency currents around the head, and to accentuate or emphasize the highest useful audio frequencies. The desired energizing current-versus-frequency characteristic at the head has been found to be a moderately emphasized low frequency peak extending to about 1500 cycles, reducing to a steady value up to about 7 kilocycles per second, and then rising at an increasing rate to about 11 kc. per second. It will be understood that the foregoing is intended for 16 mm. film sound with tape speed matched thereto, as described earlier. The series impedance comprising resistor $R_3$ and shunt capacitor $C_3$, and the series resistance $R_4$ were chosen in one specific embodiment with the values respectively of 4700 ohms, 0.01 microfarad, and 140 ohms. $L_2$ is a 53 mhy. choke having relatively low resistance $R_7$. The reactances of $C_3$ and $L_2$ at about 9500 cycles per second form a series resonant path with the load effectively paralleling the inductance $L_2$.

At low audio frequencies, i.e., below 100 cycles per second, the shunt $L_2$ serves to bleed current around the head, whereby a predetermined portion energizes the gap without over-driving. As the audio frequency is raised, the shunt inductance presents an increasing impedance while the series capacitor carries more current, bypassing the relatively high resistor $R_3$. At the high end of the audio range, the current is effectively entirely dissipated in the head, thereby providing a pre-emphasis desirable for longitudinal magnetic recording.

One method of setting the magnitude of bias current fed into the head 19, to establish an adequate bias level without suffering high frequency signal erasure due to excessive bias energy in the pole tips, is as follows. A tone of 1 kc. frequency is arranged to be produced in the output of the recording amplifier, at a level below saturation of the tape, while the bias signal is fed at a level below the desired operating level. The output level of monitor amplifier 164 is observed as the bias current is increased, as by adjusting $R_5$, until a peak output is noted. The bias energy is increased above the value for peak output on replay, until the latter drops one and one-half decibels. At this setting the lowest distortion will be had and the effects of "drop-outs" will be reduced, commensurate with good high frequency response in most commercially available tapes and films.

I claim:

1. In a recording system for impressing a record signal on a magnetizable tape record member including a recording head having a magnetic circuit and a gap therein, a gap-energizing winding associated with said magnetic circuit, a bias frequency oscillator comprising an oscillatory tank circuit having a first inductance and a first capacitance connected in parallel, an energy transfer circuit comprising a second inductance and a second capacitance connected in parallel whereof said first and said second inductances are inductively coupled by their mutual inductance, said tank circuit and said transfer circuit being resonant at a super-audible frequency, and circuit means including a feedback-stabilized audio frequency amplifier source of record signal current for energizing said transfer circuit in series with said winding, the series impedances of said transfer circuit and of said source at any audio frequency each being low compared with the series impedance of said winding and substantially constant.

2. System as in claim 1 further comprising a capacitive impedance shunting said source and wherein said bias frequency is chosen to be of the order of five times the highest frequency of said record signal, said capacitive impedance at the highest frequency of the record signal being greater than the impedance of said winding.

3. In a magnetic recording system including a head having a gap in a magnetic circuit and a winding in said head for impressing a magnetic field across said gap when said winding is energized by current, a head-feeding circuit for supplying current to said winding as load in the form of a composite signal which includes high super-audible bias frequency and audio frequency signal current components, comprising a bias frequency oscillator having an output circuit including a first capacitance and a first inductance connected in parallel, a low impedance source of audio signal energy, an energy transfer circuit including a second capacitance and a second inductance connected in parallel, said inductances being coaxially disposed and coupled by their mutual inductance and said output and said transfer circuits being resonant at said bias frequency, and circuit means connecting said energy transfer circuit in series with said source of audio signal energy and said winding, the series impedance of said winding being much higher than the series impedance of said transfer circuit to said audio frequency current component.

4. A system as in claim 3 wherein said circuit means comprise a first and a second resistor connected in series and a third capacitor connected in parallel across the first resistor, and further comprising a shunt path for audio signal currents including a third inductance connected to form a current loop with said third capacitor across said source said loop being series resonant to current at a high audio frequency.

5. A system as in claim 4 wherein said source comprises the secondary winding of an audio amplifier having a transformer output element, said amplifier having an impedance-stabilizing negative feedback loop connected between one terminal of said secondary winding and a preceding stage, said source having a capacitive impedance element connected in shunt relation, and wherein the bias frequency is chosen to be of the order of five times the highest frequency of said audio frequency current component, said capacitive impedance being less than the impedance of said head winding at the bias frequency.

6. An electrical circuit for energizing a winding for a recording head by a composite current having a first frequency component and a second frequency component, comprising first and second sources of alternating current for supplying first and second component currents respectively, said first component having a frequency extending from very low audio frequency to high audio frequency and said second component having a frequency which is of the order of five times the high audio frequency, said second source having a low series impedance at the frequency of the second component and at any audio frequency and said first source having an impedance which is low to currents of said second component and low and substantially constant for currents at any audio frequency, circuit means connecting said sources in series with each other and with said winding as common load, said means comprising a resistance element connected in series with an impedance having paralleled capacitive and resistive elements, and a shunt impedance for said first component comprising an inductive element connected in series with said capacitor across said first source.

7. A circuit as in claim 6 wherein said inductive element and said capacitor form a series resonant circuit for currents of a high audio frequency, and said second source comprises an LC circuit resonant at said second frequency loosely inductively coupled with a generator operative to supply said second current component.

References Cited in the file of this patent

UNITED STATES PATENTS

| | | |
|---|---|---|
| 2,351,010 | Camras | June 13, 1944 |
| 2,563,882 | Stolaroff | Aug. 14, 1951 |
| 2,634,335 | Stolaroff | Apr. 7, 1953 |
| 2,654,003 | Dashiell | Sept. 29, 1953 |
| 2,694,108 | Taylor | Nov. 9, 1954 |
| 2,816,281 | Aronson | Dec. 10, 1957 |
| 2,818,464 | Sziklai | Dec. 31, 1957 |

FOREIGN PATENTS

| | | |
|---|---|---|
| 811,164 | Germany | Aug. 16, 1951 |